April 23, 1946.    P. S. JACKSON    2,398,791
TOOL HEAD FOR MACHINE TOOLS
Filed Nov. 13, 1943    3 Sheets-Sheet 1

INVENTOR.
Paul S. Jackson,
BY

April 23, 1946. P. S. JACKSON 2,398,791
TOOL HEAD FOR MACHINE TOOLS
Filed Nov. 13, 1943 3 Sheets-Sheet 2
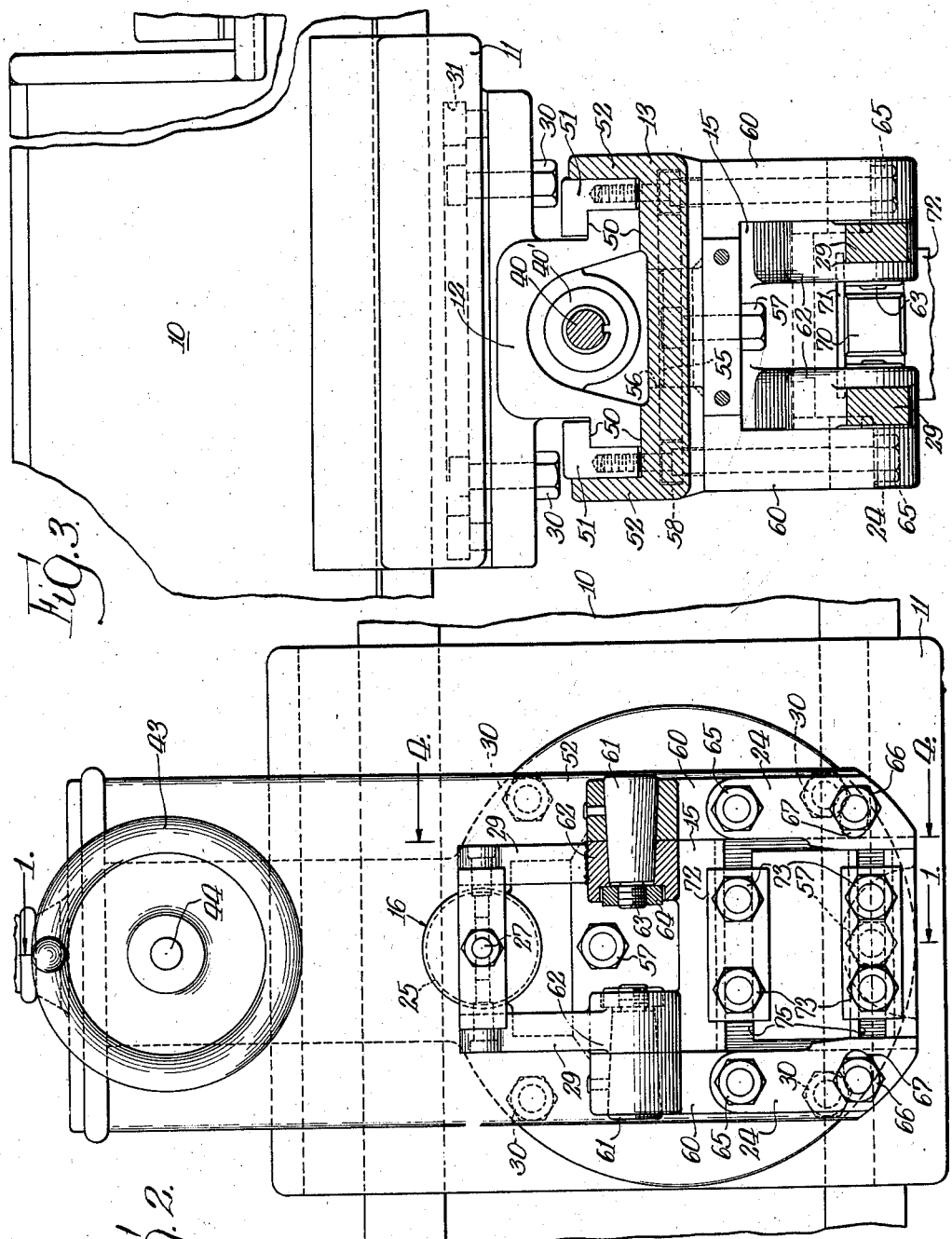
INVENTOR.
Paul S. Jackson,
BY
his Atty.

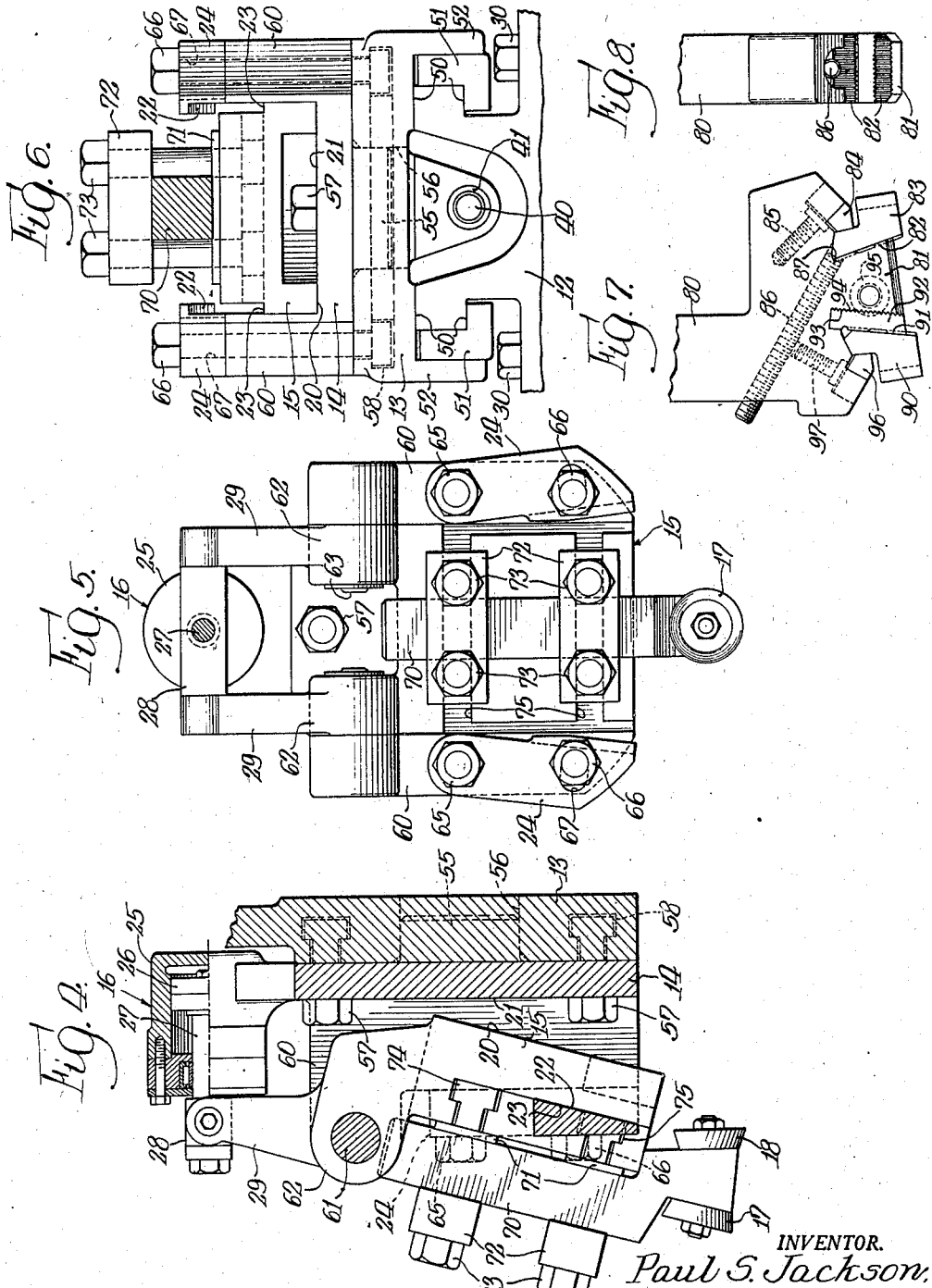

Patented Apr. 23, 1946

2,398,791

UNITED STATES PATENT OFFICE 2,398,791

TOOLHEAD FOR MACHINE TOOLS

Paul S. Jackson, Rockford, Ill., assignor to Jackson Hydraulic Machine Co., Inc., Rockford, Ill., a corporation of Illinois Application November 13, 1943, Serial No. 510,091

10 Claims. (Cl. 90—53)

More particularly, the invention relates to tool heads for planers, slotters and other machine tools of this character, it being the general object of the invention to provide a new and improved tool head construction.

Another object of the invention is to provide a tool head arranged for sliding movement on a portion of the machine frame and having a reciprocable tool slide, together with a swivel base on said slide adjustable through 360° and a tool holder carried on said base.

A more particular object is to provide a new and improved tool head embodying a tool holder arranged to carry forward and reverse cutting tools and means for actuating the tool holder to present said tools alternately in cutting position.

A further object is to provide a tool head embodying a reciprocable tool slide, a swivel base carried on said slide for adjustment angularly with respect thereto, and a reversible tool holder supported on said base, together with means for actuating said tool holder so as to present, alternately, forward and reverse cutting tools in cutting position.

Other objects will become readily apparent from the following detailed description taken in connection with the accompanying drawings wherein:

Fig. 2 is a fragmentary front elevation thereof, partly in section, along the line 2—2 of Fig. 1.

Fig. 3 is a fragmentary plan view, partly in section, along the line 3—3 of Fig. 1.

Fig. 4 is a fragmentary view, similar to Fig. 1, but with the reversible tool holder shown in its position of adjustment for presenting a tool in cutting position during a return stroke of the planer table.

Fig. 5 is a fragmentary front elevation, similar to Fig. 2, with clamps for the tool holder shown in another position of adjustment.

Fig. 6 is a plan section, approximately along the line 6—6 of Fig. 1.

Fig. 7 is a side elevation of another form of tool arranged for cutting in both directions of table movement.

Fig. 8 is an elevational view looking at the right-hand end of Fig. 7 (with the tool 83 removed).

Figure 1:
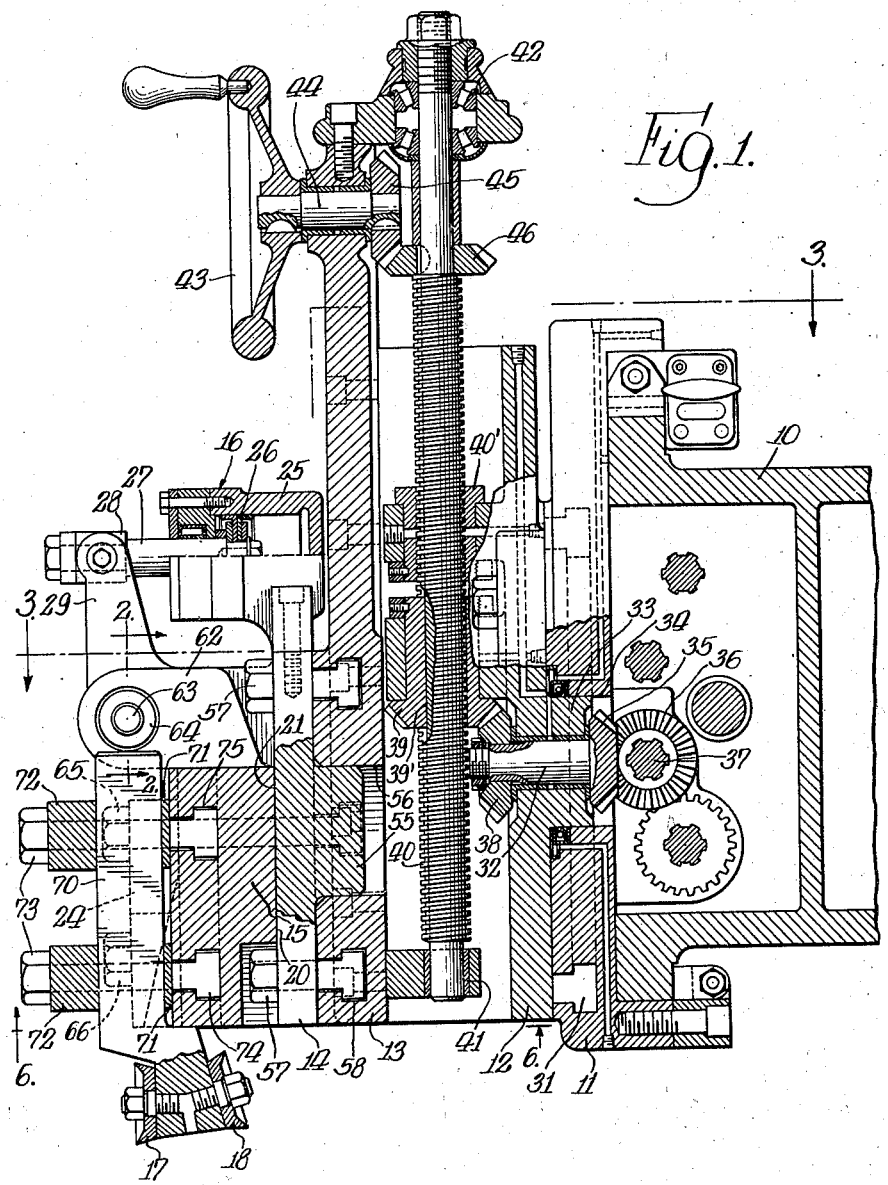
Fig. 1 is a view partly in vertical central section through a preferred form of the invention, illustrated in association with a horizontal rail on a planer.

Although there is illustrated in the drawings, and herein described in detail, a preferred form of the invention as applied to a planer rail, it is to be understood that the invention is not limited to the particular form and arrangement shown, it being contemplated that various modifications and alternative constructions may be devised by those skilled in the art without departing from the spirit and scope of the appended claims.

As shown in the drawings, a preferred form of the invention is illustrated slidably mounted upon a cross rail 10 of a planer. The tool head comprises, generally, a support 11 slidably engaging the rail 10, a swivel base 12 adjustable angularly on the support 11, a tool slide 13 reciprocably mounted on the swivel base 12, a rotatable base 14 adjustable angularly on the tool slide 13, a tool holder 15 swingably mounted on the rotatable base 14, and a piston and cylinder device 16 connected to the tool holder 15 and operable to swing the tool holder from a position as shown in Fig. 1, wherein a cutting tool 17 is presented to cutting position, to the position shown in Fig. 4, wherein a cutting tool 18 is presented to cutting position. When the tool holder 15 is in the position shown in Fig. 1 the rear surface 20 thereon abuts against the front surface 21 of the rotatable base 14. When the tool holder is swung to the position shown in Fig. 4, portions of a front surface 22 on the tool holder abut against inclined surfaces 23 on adjustable clamp devices 24 which are secured to the rotatable base 14. The piston and cylinder device includes a cylinder 25, and a piston 26 therein carried on a piston rod 27 which extends forwardly from the cylinder and is connected to a cross bar 28 which is secured at its opposite ends to arms 29 formed integrally on and extending upwardly from the tool holder 15.

The swivel base 12 may be adjusted throughout a 360° angle on the support 11, and is arranged to be clamped in its adjusted position by means of bolt devices 30 extending through apertures in the base 12, and into an annular T-slot 31 in the support 11. A short shaft 32 is journaled in a hub 33 on the base 12, this hub being positioned in a bore 34 in the support 11 so as to form a bearing for the swivel base. The shaft 32 is arranged to be driven by suitable means from the feed traverse mechanism of the machine, for example, in a manner such as disclosed in my copending application Serial No. 510,092, filed November 13, 1943. Such gearing may include beveled gears 35 and 36 and a splined shaft 37 carried on the rail 10. The other end of the shaft 32 carries a beveled gear 38 which meshes with a beveled gear 39 splined at 39' to a vertically extending feed screw 40 which is journaled on the tool slide 13 by means of a bearing 41 carried on the lower end of the slide 13 and a bearing 42 carried on the upper end thereof. The screw 40 is in threaded engagement with a non-rotatable nut 40' secured to the base 12. Thus, when the shaft 32 is rotated, the feed screw 40 is actuated to move the slide 13 on the base 12. Manual operation of the slide 13 is permitted by means of a hand wheel 43 which is keyed to a short shaft 44 rotatably mounted on the upper end of the slide 13 and carrying a beveled gear 45 which meshes with a beveled gear 46 keyed to the screw 40.

As illustrated most clearly in Fig. 3, the swivel base 12 has pairs of parallel ways 50 along opposite sides thereof on which the tool slide 13 is supported by means of adjustable angle gibs 51 and screw devices 52. The ways 50 extend parallel to the feed screw 40.

The rotatable base 14 has an integral hub 55 which engages in a bore 56 in the slide 13 in order to center the base on the slide. The base 14 is also adjustable throughout an angle of 360°, and may be secured in any position of adjustment by means of a plurality of bolt and nut devices 57, the heads of which engage in an annular T-slot 58 in the slide 13. The rotatable base 14 also has formed integrally therewith, and projecting forwardly therefrom, a pair of laterally spaced brackets 60. Adjacent their upper ends these brackets carry tapered pivot pins 61 which extend inwardly therefrom into engagement with adjacent portions 62 of the tool holder 15. The pivot pins 61 have threaded portions 63 for receiving clamping nuts 64 to secure the parts in properly assembled relation. The pivot pins 61 permit the tool holder 15 to be swung relatively to the base 14. Generally, when the machine in which the tool head is embodied is operated to move a workpiece through a forward cutting stroke, the tool holder 15 is in the position shown in Figs. 1 to 3, wherein the rear surface 20 thereof abuts the adjacent forward surface 21 of the rotatable base 14. If the machine is set up to cut only in a forward direction, the tool holder can swing in a clockwise direction, away from the position shown in Fig. 1, so that the tool 17 will not drag over the work during the return stroke.

If the machine is set up to cut during the return stroke of the work, the tool holder 15 is swung to the position shown in Fig. 4 so as to present the cutter 18 to cutting position. In order to support the tool holder 15 when in the cutting position shown in Fig. 4, the clamps 24 are provided. These are swingably mounted on the bracket portion 60 of the base 14 by means of headed bolt devices 65, and are arranged to be clamped in adjusted position by means of headed bolt devices 66 which pass through arcuate slots 67 in the clamps. When the clamps are in the position shown in Figs. 1 to 3, the angular rear surfaces 23 thereof are positioned to abut along the edges of the forward surface 22 of the tool holder 15, as shown in Fig. 4. This provides a rigid backing for the tool holder when in this position. When the machine is not set up for cutting during the return stroke of the work, the clamps 24 may be swung apart, as shown in Fig. 5, so as to permit the tool holder 15 to move freely therebetween.

As illustrated in Figs. 1 to 6, the cutters 17 and 18 form a part of a tool having a rectangular shank 70 which is held in place on the tool holder 15 by means of cross bars 71 and 72 and bolt devices 73. The heads of the bolts are slidably fitted in T-slots 74 and 75, extending transversely of the tool holder, as shown in Figs. 2 and 5, so that the tool may be supported in various positions thereon.

In Figs. 7 and 8 there is illustrated a modified form of tool comprising a rectangular shank 80 and a head 81. The head has an inclined surface 82 against which a cutter 83 is held by means of a clamp 84 which is secured to the head by means of a screw device 85. The vertical position of the cutter 83 on the tool head may be adjusted by means of a screw device 86 extending through the head, the inner end of said screw device engaging a beveled surface 87 on the tool.

A second cutter 90 is positioned against a surface 91 on the head 81, extending at an angle of approximately 15° to the surface 82. The surface 91 is formed on a laterally adjustable member 92 which forms a portion of the head, and is serrated at 93 to match corresponding serrations 94 on the head. The member 92 is adjustable transversely by means of a headed screw device 95. The tool 90 is arranged to be held against the surface 91 by means of a clamp 96 which is secured to the head by means of a screw device 97.

Preferably, the portions of the tools engaging the inclined surfaces on the head 81 are serrated vertically, and the head is correspondingly serrated to insure proper positioning of the tools on the head. The screw device 86 enables the cutter 83 to be adjusted vertically with respect to the cutter 90 so that they will cut properly, and the laterally adjustable member 92 permits lateral adjustment of the cutter 90 with respect to the cutter 83 so as to position the tools relatively to each other in a horizontal or transverse direction. In the forms illustrated herein, the cutters of the tools are arranged at an angle of approximately 15° to each other to correspond with a swing of approximately 15° for which the tool holder 15 is designed.

It is apparent that the tool head disclosed herein is adapted to be adjusted in various ways to take care of a great variety of cutting operations. For example, the swivel base 12 may be adjusted angularly upon the support 11 so that the tool slide 13 will be reciprocated along any diameter selected, passing through the axis of the shaft 32. In addition, the rotatable base 14 may be adjusted angularly on the tool slide 13 throughout 360° of movement, and can be positioned to direct the tools carried by the tool holder 15 in any selected direction extending radially of the hub 55. Furthermore, in the various positions of adjustment of the swivel base and/or rotatable base, the tool holder 15 may be provided with either a single cutting tool or a two-way cutting tool. A backing for the tool holder, when a single cutting tool is employed, is adequately furnished by the rotatable base. With the use of a two-way cutting tool, the clamps 24 may be secured in positions abutting the tool holder to limit its movement and back it up during a reverse cutting operation.

I claim as my invention:

1. A tool head for planers and the like, comprising a support, a base swiveled thereon, a tool slide reciprocably mounted on said base, a tool holder pivotally mounted on said slide and adapted to carry one tool for cutting in one direction and another tool for cutting in a reverse direction, a piston and cylinder device for shifting said tool holder between two operative positions, and abutment means for limiting the movement of the tool holder by said piston and cylinder device in both of its operative positions.

2. A tool head as defined in claim 1 having a rotatable base on the tool slide and carrying the tool holder.

3. A tool head for planers and the like, comprising a support, a tool slide reciprocably mounted on said support, a tool holder pivotally mounted on said slide and adapted to carry one tool for cutting in one direction and another tool for cutting in a reverse direction, a piston and cylinder device for shifting said tool holder between two operative positions, and abutment means for limiting the movement of the tool holder by said piston and cylinder device to said operative positions and including means shiftable out of abutting position to permit further movement of the tool holder in one direction.

4. A tool head as defined in claim 3 having a rotatable base on the tool slide and carrying the tool holder.

5. A tool head comprising a support adapted to be slidably mounted on a machine frame, a base swiveled thereon, a tool slide reciprocably mounted on said base, a rotatable base on said slide and carrying a pair of laterally spaced outwardly extending brackets, a tool holder, pivot means on said brackets engaging said tool holder to support it swingably between the brackets, and means for limiting the swinging movement of the tool holder in one direction comprising a pair of clamps adjustably secured to said brackets and movable from positions overlying the tool holder to withdrawn positions away from the tool holder.

6. A tool head comprising a support adapted to be slidably mounted on a machine frame, a tool slide reciprocably mounted on said support, means on said slide forming a pair of laterally spaced brackets, a tool holder, pivot means on said brackets engaging said tool holder to support it swingably between the brackets, means for limiting the swinging movement of the tool holder in one direction comprising a pair of clamps adjustably secured to said brackets and movable from positions overlying the tool holder to withdrawn positions away from the tool holder, and means for shifting the tool holder from one position to another.

7. A tool head comprising a support adapted to be slidably mounted on a machine frame, a tool slide reciprocably mounted on said support, a rotatable base on said slide and carrying a pair of laterally spaced brackets, a tool holder, pivot means on said bracket engaging said tool holder to support it swingably between the brackets, means for limiting the swinging movement of the tool holder in opposite directions, and means for shifting the tool holder from one end of its swinging movement to the other.

8. A tool head comprising a support adapted to be slidably mounted on a machine frame, a base swiveled thereon, a tool slide reciprocably mounted on said base, a rotatable base on said slide adjustable through an angle of 360° thereon, means on said rotatable base and said slide cooperating to secure said base in any one of its adjusted positions on said slide and to support the rotatable base in such position on the slide, and a tool holder carried on said rotatable base.

9. A tool head comprising a support adapted to be slidably mounted on a machine frame, a base swiveled thereon, a tool slide reciprocably mounted on said base, a rotatable base on said slide adjustable through an angle of 360° thereon, a tool holder swingably mounted on said rotatable base and adapted to carry forward and reverse cutting tools oppositely positioned thereon, and a piston and cylinder device operable to shift the tool holder to present such tools alternately to cutting position.

10. A tool head comprising a support adapted to be slidably mounted on a machine frame, a tool slide reciprocably mounted on said support, a rotatable base on said slide, a tool holder, pivot means on said rotatable base engaging said tool holder to support it swingably thereon, means for limiting the swinging movement of the tool holder in opposite directions, and means for shifting the tool holder from one end of its swinging movement to the other.

PAUL S. JACKSON.